June 26, 1956     A. G. HUPP     2,751,833
POWER DRIVEN IMPLEMENT ATTACHMENT FOR GARDEN TRACTORS
Filed May 12, 1950     3 Sheets-Sheet 2

INVENTOR.
Arleigh G. Hupp
BY
Andrus & Sceales
Attorneys

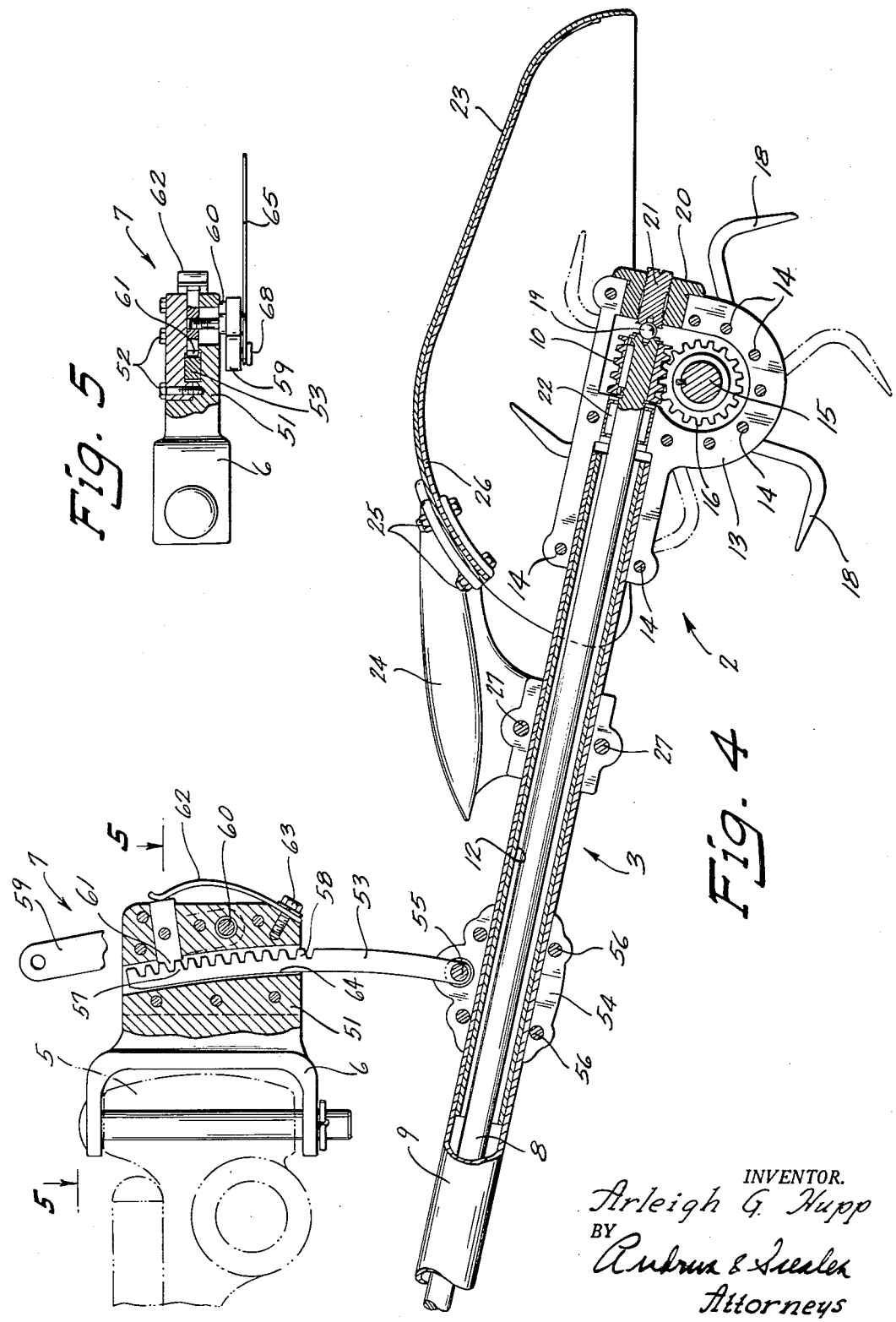

2,751,833
Patented June 26, 1956

2,751,833

POWER DRIVEN IMPLEMENT ATTACHMENT FOR GARDEN TRACTORS

Arleigh Glynn Hupp, Milwaukee, Wis., assignor to Andrus & Sceales, Milwaukee, Wis., a copartnership Application May 12, 1950, Serial No. 161,700

4 Claims. (Cl. 97—40)

This invention relates to a power-driven implement attachment for small garden tractors.

One of the principal objects of the invention is to provide an implement attachment for tractors that is simple in design, light in weight and of a strong and rigid construction.

A further object is to provide an implement attachment that can be readily secured to and removed from a tractor by simple hitching operations.

Another object is to provide an attachment that includes a power driving mechanism that may be readily separated from the implement which it drives and which can be united with a variety of implements for attachment to a small garden tractor.

Another object is to provide a tiller attachment that is so positioned with respect to the tractor that its tilling action will increase traction between the tractor wheels and the surface over which they travel.

Another object is to provide a tiller attachment with a cutting action calculated to hug the surface being tilled.

A principal object is to provide a tiller attachment that can be readily controlled for depth of cut by simple adjustment.

Various tillers may be employed to advantage, but certain of the above objects require the use of an under-cut tiller, such as that described and claimed in copending application Serial No. 107,935, filed August 1, 1949, by the present inventor, now abandoned.

The tiller attachment may be secured to and driven by tractors of various design, but a tractor such as that described in copending application Serial No. 112,252, filed August 25, 1949, now Patent No. 2,709,493, by the present inventor, is particularly adaptable.

An embodiment of the invention is illustrated in the accompanying drawings in which:

Fig. 4 is an enlarged transverse sectional view of the rear portion of the power drive attachment, the implement, and the adjustable mechanism for connecting said members to the garden tractor; and Fig. 5 is a sectional view of the adjustable connecting mechanism taken on line 5—5 of Fig. 4.

Figure 1:
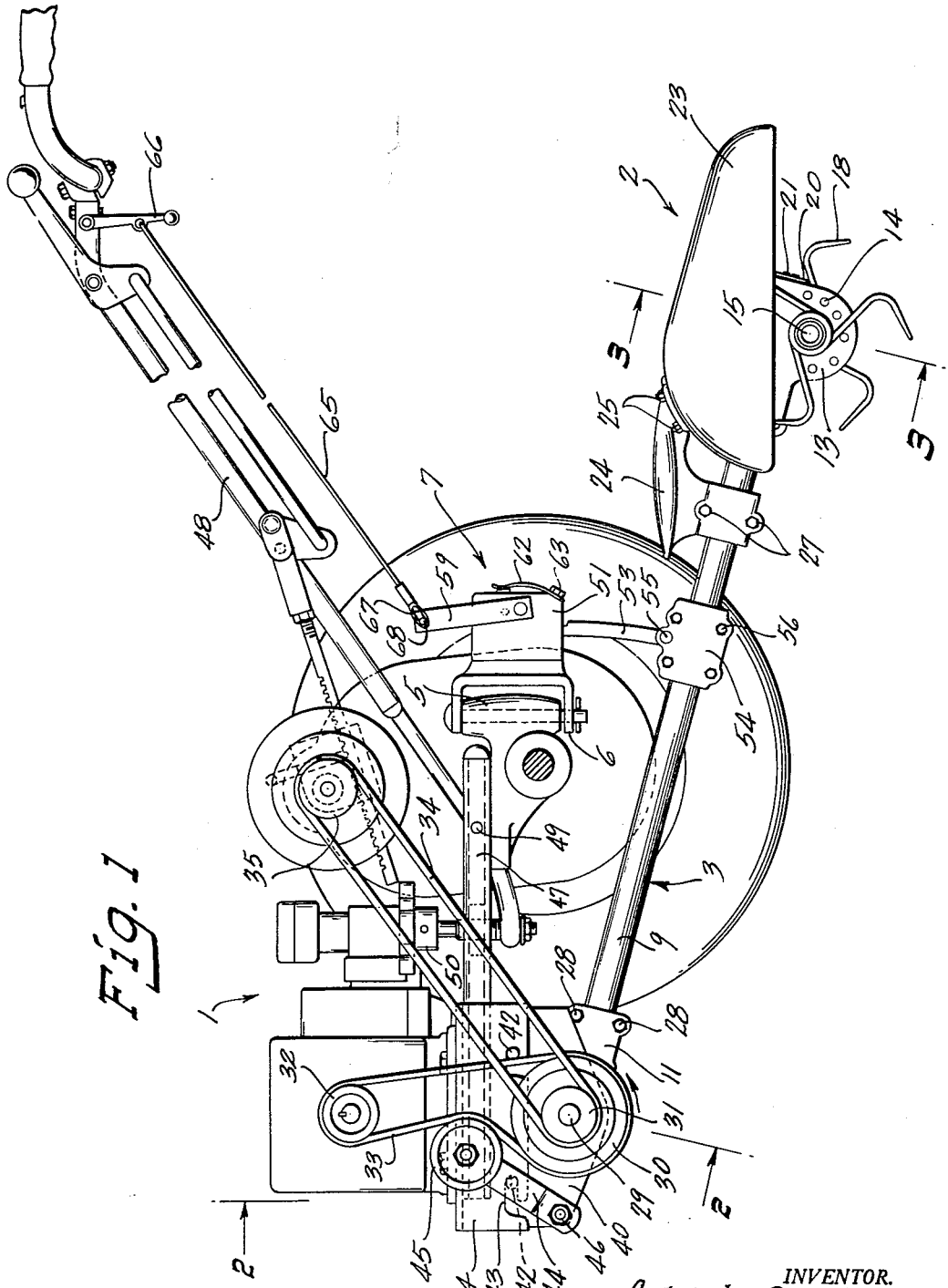
Figure 1 is a side elevation of the implement attachment showing it secured to the hitch of a tractor described in the last mentioned copending application.
Figure 2:
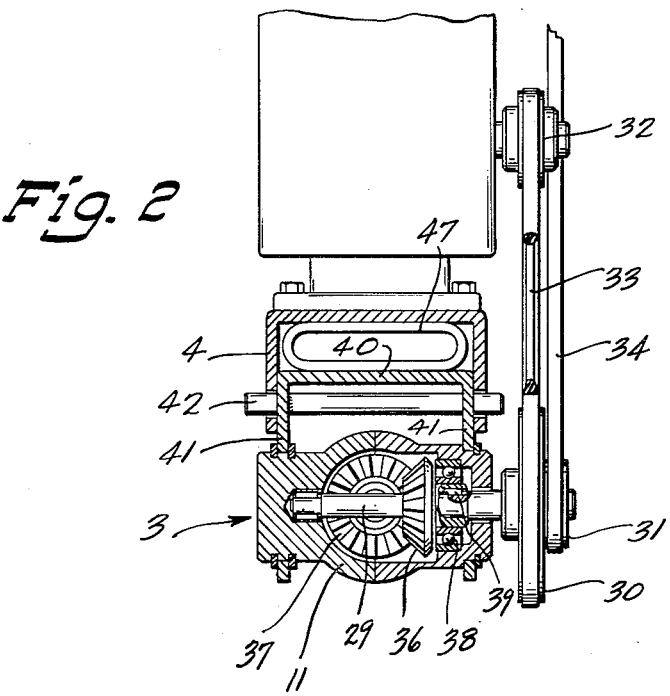
Fig. 2 is an enlarged sectional view of the forward hitching means, drive sheaves and gear assembly taken on line 2—2 of Fig. 1.
Figure 3:
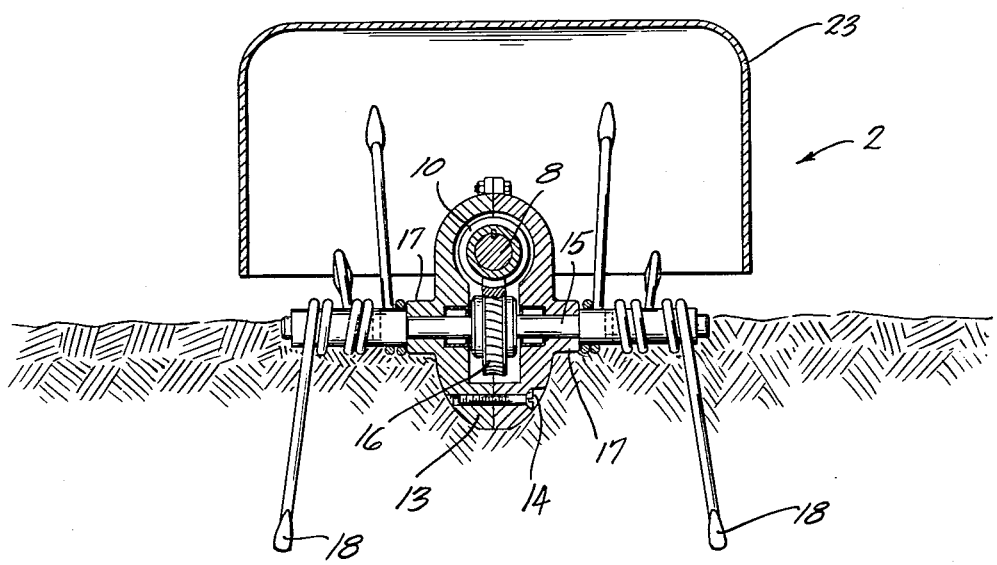
Fig. 3 is an enlarged sectional view of the rear gear and tine assembly taken on line 3—3 of Fig. 1.

The structure illustrated comprises a two-wheeled garden tractor 1, a tiller or other power-driven implement 2 and a power drive attachment 3 between the tractor and the implement.

Channel shaped hitch 4 pivotally secures the forward end of drive attachment 3 to tractor 1.

Draw bar hitch 5 provides a second point of attachment for drive attachment 3 rearwardly of the above mentioned channel hitch 4 and disposed towards the rear end of attachment 3 carrying the implement 2.

A straddle bracket 6 and adjustable connecting mechanism, shown generally at 7, secure drive attachment 3 to draw bar hitch 5 at this second rearward point of attachment. As will be more fully described, adjustable mechanism 7 affords means by which the rear end of drive attachment 3 may be rigidly disposed at a plurality of positions relative to its pivotally secured forward end.

Power drive attachment 3 comprises, generally, a drive shaft 8 rotatably disposed in a tubular sleeve 9, a worm gear 10 disposed at the rear end of shaft 8 to cooperate with a matching gear carried by the attached implement and a gear housing 11 disposed at the forward end of shaft 8 and enclosing gears to receive and transmit power provided by the tractor 1.

Cylindrical reinforcing sleeve 12 is disposed within sleeve 9 about a rear portion of shaft 8 to strengthen sleeve 9 for the attachment of various members to be described.

As illustrated, implement 2 is a tiller enclosed in a split gear housing 13.

Housing 13 is disposed at the rear end of sleeves 9 and 12, its two sections being secured together by bolts 14 to draw it tightly about sleeves 9 and 12.

Transverse shaft 15 is disposed within housing 13 to be driven by shaft 8 and to in turn drive implement 2.

Gear 16 is centrally secured to shaft 15 and so disposed as to engage worm gear 10 on drive shaft 8 and transmit power therefrom to shaft 15.

Shaft 15 is supported by side protrusions 17 of housing 13 and extends through protrusions 17 to without housing 13.

A plurality of tiller tines 18 are wrapped about transverse shaft 15 without housing 13 to engage the surface to be tilled. Tines 18 may be of any suitable design and may be affixed to shaft 15 in various ways, but, as illustrated, they are constructed and assembled in accordance with copending application Serial No. 97,737, filed June 8, 1949, by the present inventor, now abandoned.

Tines 18 are so disposed as to face forwardly on the underside of shaft 15 and to face rearwardly on the upper side of shaft 15, whereby an undercut tilling operation is obtained. Such cutting action prevents the tiller implement 2 from raising upon tines 18 and overrunning forwardly. It encourages the maintenance of a consistent depth of cut, reduces the amount of power required for a given tilling speed, and causes the tractor and implement to be more easily managed and controlled.

Thrust exerted by drive shaft 8 during the cutting operation is absorbed by ball 19 disposed adjacent to the rear end of shaft 8 within housing 13.

Ferrule 20 and its centrally contained plug 21 disposed in the rear wall of housing 13 in alignment with drive shaft 8 seat ball 19 and cause it to continually bear against the rear end of shaft 8. Plug 21 is threaded to ferrule 20 for ready removal.

The rear end of drive shaft 8 is also carried by needle bearing unit 22 disposed about shaft 8 forwardly of worm gear 10.

Shield 23 is provided above tiller implement 2 to deflect objects uprooted by tines 18 and is disposed to enclose the upper portion of housing 13 and to envelop tines 18 when they are on the upper side of transverse shaft 15.

Shield 23 has its sides and rear end extending downwardly close to the ground, and its rear end generally tapers rearwardly to ride on the ground and level it as the tiller moves forwardly.

Shield 23 is secured to sleeves 9 and 12 by bracket 24.

The rear portion of bracket 24 is secured to the top surface of shield 23 by bolts 25. A reinforcing plate 26 may be interposed between bolts 25 and shield 23 to strengthen the area of its attachment.

The forward end of bracket 24 is of a split construction having vertical sides that fit about sleeves 9 and 12 and are drawn tightly together by bolts 27. Shield 23 is thus rigidly supported above tines 18.

It will be seen that tiller implement 2 may be removed in its entirety from power drive attachment 3 by merely loosening draw bolts 14 which clamp housing 13 to sleeve 9 in vice-like manner. By sliding housing 13 rearwardly along sleeve 9, worm gear 10 on shaft 8 is separated from gear 16 and upon complete removal of housing 13 the rear end of shaft 8 and its worm gear 10 are exposed. Another similarly housed and geared implement could be substituted for tiller implement 2, the only restriction being that it contains a gear disposed to mesh with worm 10.

Shield 23 may be readily removed by merely loosening bolts 27.

As previously stated, a gear housing 11 is disposed at the forward end of drive shaft 8 enclosing gears to receive and transmit power provided by the tractor 1.

Housing 11 is also of split construction and is clamped tightly about tubular sleeve 9 by bolts 28, much in the same manner as was rear housing 13.

Transverse gear shaft 29 is supported upon side protrusions in housing 11 and extends through an aperture in one of the said protrusions of housing 11 to support belt sheaves 30 and 31 without housing 11 for the reception of power from tractor 1 and for transmission of power to the tractor wheels, as will be described.

Power from the engine of tractor 1 is supplied from engine drive pulley 32 and transmitted by belt 33 to reception sheave 30 on shaft 29.

The power thus delivered to shaft 29 is further transmitted from sheave 31, also on shaft 29, through belt 34 to sheave 35 disposed and adapted to deliver power to the wheels of tractor 1.

Bevel gear 36 is secured to transverse gear shaft 29 within housing 11 to relay power from shaft 29 to drive shaft 8.

Meshing with gear 36 is a matching bevel gear 37 secured to the forward end of shaft 8 to complete the transfer of power from shaft 29 and gear 36 to shaft 8.

The hub of gear 36 is rotatably mounted in the housing 11 within bearing 38 and is secured to rotate with shaft 29 by key 39.

The power originating at the engine of tractor 1 is transmitted to shaft 29 and thence both to the tractor wheels through belt 34 and to tiller implement 2 through drive shaft 8.

The V-belt clutch for power transmission described in copending application Serial No. 37,281, filed July 6, 1948, by the present inventor, now Patent No. 2,576,605, is readily adaptable to the transmission herein described.

As previously stated, channel-shaped hitch 4 pivotally secures the forward end of drive attachment 3 to tractor 1. This is accomplished by interposing a channel-shaped straddle bracket 40 between hitch 4 and the forward gear housing 11 of drive attachment 3.

As illustrated, straddle bracket 40 is rectangular in shape having vertical longitudinal side members 41 which are pivotally secured to the previously described side protrusions of housing 11.

Side members 41 of bracket 40 are spaced but slightly closer together than the side members of channel-shaped hitch 4 so that the respective sides will abut when bracket 40 is inserted upwardly to within hitch 4.

Bracket 40 is secured to hitch 4 by pins 42 secured to, and extending through the sides 41 of bracket 40 and which are disposed and held within bayonet slots 43 in the sides of hitch 4.

Pivotally secured to bracket 40 is lever 44 which carries idler pulley 45. Idler 45 is disposed to exert pressure against belt 33 leading from the engine of tractor 1. Changes in the pivotal position of idler 45 may be made by loosening bolt 46 which secures lever 44. Such changes in position may be necessary, due to stretching of belt 33 or to facilitate its removal.

The construction of hitch 4 is completely described in the above identified copending garden tractor application, Serial No. 112,252. Also described therein is tubular longitudinal frame 47 supporting both hitch 4 and draw bar hitch 5, guiding column 48 pivotally secured to frame 47 by pin 49 and provided for the manual guiding of the tractor, and adjustment mechanism 50 which rigidly secures column 48 to frame 47 and which makes possible the easy adjustment of the inclination of column 48.

As previously mentioned, draw bar hitch 5 provides a second point of attachment for drive attachment 3 rearwardly of hitch 4.

Straddle bracket 6 and adjustable connecting mechanism 7 secure drive attachment 3 to draw bar hitch 5.

Mechanism 7 is partially housed in a casing 51 disposed behind bracket 6 and secured thereto by a plurality of screws 52.

A column 53 extends upwardly from sleeve 9 of drive attachment 3 through apertures in the bottom and top of casing 51, forming a connector between casing 51 and sleeve 9.

Split clamp 54 secures column 53 to sleeve 9, being pivotally secured to column 53 by pin 55 and drawn tightly about sleeve 9 and its reinforcing sleeve 12 by bolts 56.

The upper rear edge of column 53 has formed in it a plurality of teeth segments 57 which form a rack 58 thereon.

A lever 59 is pivotally secured to casing 51 by pin 60 and is adapted to carry a tooth 61 having its front end, formed complementary to teeth segments 57 of column 53.

Leaf spring 62 is secured to the rear of casing 51 by bolt 63 and is disposed to bias tooth 61 against rack 58 and between predetermined teeth segments 57 of rack 58.

Bracket 6, to which casing 51 is secured, extends rearwardly to within casing 51 to provide a surface 64 against which spring 62 and tooth 61 can force column 53.

Column 53 is thus held against bracket 6, and being so held secures the rear portion of sleeve 9 and power drive attachment 3 at a given position relative to their forward ends pivotally secured to hitch 4 by bracket 40.

Tiller implement 2, being rigidly secured to the rear end of drive attachment 3, changes its position relative to tractor 1 with any change in position of drive attachment 3 relative to tractor 1. Thus, it will be seen that by changing the position of column 53 within casing 51 and by causing tooth 61 to hold column 53 within casing 51 at said new position by having it engage different teeth segments of rack 58, the relative position of implement 2 will change with respect to tractor 1.

In the case of the tiller implement illustrated, the depth of cut of tines 18 may be varied by a mere change of engagement of tooth 61 with rack 58.

To facilitate changes in position of engagement of tooth 61, one end of a rod 65 is secured to lever 59 which carries tooth 61, and the other end of the rod 65 is secured to a handle 66 disposed conveniently within the reach of the operator of tractor 1.

By pulling rod 65 rearwardly, the operator may disengage tooth 61 from rack 58.

Then, by exerting downward pressure upon guiding column 48 of tractor 1, the operator may readily change the position of column 53 within casing 51. Such will be the case as any downward movement of tractor 1 caused by downward pressure upon guiding column 48 will cause the tractor to pivot about forward hitch 4 since implement 2 and drive attachment 3 are prevented from downward movement by the ground upon which they rest.

Having thus changed the position of column 53 within casing 51, the operator need only release rod 65 and spring 62 will cause tooth 61 to engage rack 58 at a new position with respect to teeth segments 57.

As shown, rod 65 is secured to lever 59 by loop 67 and pin 68.

Column 53 is shown bent slightly forwardly to account for the arcuate vertical movement which casing 51 would make during the described pivotal adjustment.

As described, the tiller implement 2 and its power drive attachment 3 are simple in construction, may be readily separated by merely loosening bolts 14, and when united may be easily secured to tractor 1 by slipping straddle bracket 6 about draw bar hitch 5 and by a simple bayonet slot insertion of bracket 40 into forward hitch 4. Further, the implement 2 may be readily adjusted for depth of cut by adjustable connecting mechanism 7.

The securing of column 53 in casing 51 may be adjusted to accommodate different height handle bar locations for different operators; and when secured, column 51 overcomes any torque on arm 3 tending to pivot the same on axis 29 due to the driving forces between gears 36 and 37. The arm 3 is thereby locked against pivoting on axis 29 and the operator is relieved of forces which would otherwise be transmitted to the handle bars.

The direction of rotation of sheaves 30 and 31 and of gear 36 is counterclockwise as viewed in Fig. 1, and tends to lift the tiller over an obstruction provided the operator releases tooth 61 from the rack 57 and permits column 53 to move upwardly.

Various embodiments of the invention may be employed within the scope of the accompanying claims.

I claim:

1. A rotary tiller for attachment to a two-wheeled garden tractor comprising, a longitudinal drive shaft, one or more tiller tines disposed to revolve adjacent to the rear end of said drive shaft on an axis transverse thereto, reduction gear means to drive said tines from said drive shaft, means for pivotally securing said tiller to said tractor near the forward end of said drive shaft, gear means at the pivotal end of said shaft for driving the same from the tractor engine, said gear means tending to effect pivotal movement of the shaft under power load, a substantially vertical column secured to said tiller other than at the last mentioned pivotally secured end of said shaft and extending upwardly adjacent to said tractor, teeth segments forming a rack on said column adjacent to said tractor, a pin carried by the tractor disposed to engage said teeth segments, means for engaging and disengaging said pin in said rack, and means disposed to pivot said implement about its aforementioned pivotally secured end thereby changing the relative position of said column with respect to said pin, said pin serving to secure said drive shaft and tiller against pivoting under loads on said gear means when said pin is interlocked with said vertical column.

2. A rotary tiller for attachment to a two-wheeled garden tractor comprising, a longitudinal drive shaft rotatably disposed within a tubular sleeve, a transverse tiller shaft disposed adjacent to the rear end of said drive shaft, tiller tines disposed to revolve about said tiller shaft, a power transmission from said tractor to said drive shaft reduction gear means between the drive shaft and tiller shaft, means for pivotally securing the forward end of said tubular sleeve to said tractor to provide for pivotal raising and lowering of the tiller relative to the tractor, said power transmission including gears disposed to drive said drive shaft at said pivotal connection and tending to effect pivoting of said tiller under load, and an adjustable means for securing said tiller attachment to said tractor whereby said tiller attachment can be pivoted about a transverse axis adjacent the forward end of said tubular sleeve relative to said tractor and then secured in any one of a plurality of relative positions against pivoting of said tiller by said gears under power load.

3. A rotary tiller for attachment to a two-wheeled garden tractor comprising, a longitudinal drive shaft rotatably disposed within a tubular sleeve, a rear gear housing disposed upon the rear end of said tubular sleeve, a worm gear secured to the rear end of said drive shaft within said rear gear housing, a transverse tiller shaft disposed within said rear gear housing and extending through its walls, a spur gear secured to said tiller shaft in engagement with said worm gear, one or more tiller tines disposed upon said tiller shaft to rotate without said rear gear housing, a front gear housing disposed upon the forward end of said tubular sleeve, a bevel gear secured to the forward end of said drive shaft within said front gear housing, a transverse power shaft disposed within said front gear housing, a matching bevel gear secured to said power shaft and in engagement with the first mentioned bevel gear, a power transmitting means from said tractor to said power shaft, means pivotally securing said front gear housing to said tractor upon the axis of said power shaft, and adjustable means securing said tubular sleeve to said tractor whereby said tubular sleeve can be pivoted about said front gear housing relative to said tractor and then secured in any one of a plurality of relative positions against forces tending to pivot said sleeve under load on said beveled gears.

4. In combination with a two-wheeled garden tractor having a frame between the wheels and extending forwardly thereof and having hitch means at the forward end of said frame to receive selectively implements to be driven and operated by the tractor and control column rigidly secured to the frame and extending upwardly and rearwardly of the tractor for manipulation thereof by the operator, said tractor including an engine mounted on said frame above said hitch means and having a pulley and belt drive connected to the tractor wheels to drive the same; an implement attached to the tractor including a complementary hitch member to be joined to said hitch means, a gear case pivotally supported by said hitch member on a transverse axis and having a shaft coincident therewith, a pulley mounted on said shaft to receive said belt means, a longitudinal shaft housing rigidly secured at its forward end to said gear case and extending therefrom beneath said frame and control column toward the ground, a transmission fixed to the rear end of said housing and having a transverse shaft carrying a series of tines, a drive shaft extending from said gear case to said transmission within said housing to drive the tines of said implement with rotation of said first named shaft, the rotation of said first named shaft, being in a direction corresponding to the direction of angular adjustment of said shaft housing which raises the tines from the ground, and adjustable connecting means secured to said shaft housing and to the rear portion of said frame and being adjustable to secure said shaft housing against rotation on the axis of said pulley shaft and being releasable to allow adjustment of said housing relative to said tractor frame on said axis as in passing over objects.

References Cited in the file of this patent
UNITED STATES PATENTS

| | | |
|---|---|---|
| 1,059,948 | Neberle | Apr. 22, 1913 |
| 1,693,925 | Holt | Dec. 4, 1928 |
| 1,807,784 | Geffroy | June 2, 1931 |
| 2,012,434 | Pedersen | Aug. 27, 1935 |
| 2,207,943 | Piljugin et al. | July 16, 1940 |
| 2,270,250 | Birr | Jan. 20, 1942 |
| 2,279,652 | Beard | Apr. 14, 1942 |
| 2,287,479 | Kelsey | June 23, 1942 |
| 2,306,902 | Rabe | Dec. 29, 1942 |
| 2,488,265 | Bozeman et al. | Nov. 15, 1949 |
| 2,491,892 | Claus | Dec. 20, 1949 |
| 2,545,735 | Howard | Mar. 20, 1951 |
| 2,558,822 | Claus | July 3, 1951 |
| 2,597,107 | Kelsey | May 20, 1952 |
| 2,691,928 | Kelsey et al. | Oct. 19, 1954 |